United States Patent
Savagaonkar et al.

(10) Patent No.: US 10,268,470 B2
(45) Date of Patent: Apr. 23, 2019

(54) METHOD AND SYSTEM FOR TRACKING PROGRESS AND PROVIDING FAULT TOLERANCE IN AUTOMATED UPGRADE OF A NETWORK VIRTUALIZATION PLATFORM

(71) Applicant: Nicira, Inc., Palo Alto, CA (US)

(72) Inventors: Amita Savagaonkar, Pune (IN); Makarand Gawade, Pune (IN); Amit Sangodkar, Pune (IN); Kumaraguru Shanmugam, Pune (IN)

(73) Assignee: NICIRA, INC., Palo Alto, CA (US)

( * ) Notice: Subject to any disclaimer, the term of this patent is extended or adjusted under 35 U.S.C. 154(b) by 87 days.

(21) Appl. No.: 15/438,670

(22) Filed: Feb. 21, 2017

(65) Prior Publication Data
US 2018/0060061 A1    Mar. 1, 2018

(30) Foreign Application Priority Data
Aug. 26, 2016    (IN) .............................. 201641029134

(51) Int. Cl.
| G06F 11/00 | (2006.01) |
| G06F 8/65 | (2018.01) |
| G06F 9/455 | (2018.01) |
| H04L 12/24 | (2006.01) |

(52) U.S. Cl.
CPC ............ G06F 8/65 (2013.01); G06F 9/45558 (2013.01); H04L 41/082 (2013.01); *G06F 2009/45595* (2013.01)

(58) Field of Classification Search
CPC ............................ G06F 11/0709; G06F 11/07
See application file for complete search history.

(56) References Cited

U.S. PATENT DOCUMENTS

| 2002/0176562 | A1* | 11/2002 | Hao | H04M 3/12 |
| | | | | 379/221.13 |
| 2003/0056146 | A1* | 3/2003 | Freeman | G06K 15/00 |
| | | | | 714/25 |
| 2008/0134164 | A1* | 6/2008 | Stich | G06F 8/65 |
| | | | | 717/172 |
| 2013/0055155 | A1* | 2/2013 | Wong | G06F 8/65 |
| | | | | 715/810 |
| 2017/0222889 | A1* | 8/2017 | Zong | H04L 41/5051 |
| 2018/0004503 | A1* | 1/2018 | OlmstedThompson | G06F 8/65 |

* cited by examiner

*Primary Examiner* — Sarai E Butler
(74) *Attorney, Agent, or Firm* — Adeli LLP (57) ABSTRACT

A method of upgrading nodes of a network virtualization platform is provided. The method receives a definition of an upgrade plan to upgrade a group of upgrade units. Each upgrade unit includes a set of nodes of the network virtualization platform. The plan groups sets of upgrade units into one or more upgrade groups and specifies a set of parameters for upgrading each upgrade unit. The method sends upgrade instructions to each upgrade unit to trigger upgrade for the upgrade unit. The method receives upgrade status from the upgrade units. The method aggregates and displays the status for the upgrade units of each upgrade group. When upgrade is in paused state, the method allows modifications to the upgrade plan. The method re-computes the upgrade plan before starting or resuming the upgrade. The upgrade plan is persisted by storing a portion of the upgrade plan needed to re-compute the upgrade plan.

20 Claims, 7 Drawing Sheets

METHOD AND SYSTEM FOR TRACKING PROGRESS AND PROVIDING FAULT TOLERANCE IN AUTOMATED UPGRADE OF A NETWORK VIRTUALIZATION PLATFORM

CLAIM OF BENEFIT TO PRIOR APPLICATIONS

This application claims the benefit of Indian Patent Application No. 201641029134, titled "Method and System for Tracking Progress and Providing Fault Tolerance in Automated Upgrade of a Network Virtualization Platform" and filed on Aug. 26, 2016. India Patent Application No. 201641029134 is incorporated herein by reference.

BACKGROUND

Server virtualization allows dynamic allocation of compute and storage resources of a physical data center based on customer's needs. Network virtualization extends virtualization technologies across a data center infrastructure and delivers for networking what has been delivered for compute and storage.

Network virtualization platform architecture includes several components or planes. Data plane is used to carry the network user packet traffic. Control plane is used to carry signaling traffic. Management plane is used to perform administrative tasks and to interface with human administrators.

The data plane includes host machines' virtualization software (e.g., hypervisors) that provides logical switches, logical routers, firewalls, etc. The control plane includes a cluster of control servers, which are used to program the logical switches, logical routers, etc. The management plane includes a cluster of management nodes that interface to cloud users through a set of application programming interfaces (APIs) and user interfaces (UIs).

Each one of these components (or planes) of the network virtualization platform architecture is implemented by a combination of software, firmware, and hardware provided by different vendors and entities. There is often a need to upgrade the software and roll out new versions, bug fixes, implement upgrades, etc., for different components of the network virtualization platform. In the past, software upgrades were implemented in an ad-hoc fashion, without giving an administrator much control over the sequence of upgrades, troubleshooting of the issues encountered, or receiving uniform and concise status and progress reports.

BRIEF SUMMARY

Some embodiments provide an upgrade coordinator for defining and executing an upgrade plan for upgrading software for different nodes in a network virtualization platform. A user interface allows an administrator to define an upgrade plan by either modifying a default upgrade plan, modifying a previous upgrade plan, or defining an upgrade plan from scratch.

The upgrade coordinator executes the upgrade as specified in the upgrade plan. For each component of the network virtualization platform (i.e., data, control, or management planes), the upgrade plan in some embodiments includes a list of groups and each group includes a list of upgrade units (or upgrade node). The upgrade units can either be an individual node or a cluster of nodes.

An upgrade plan in some embodiments has settings to indicate whether the groups in each network virtualization platform component should be upgraded serially or in parallel. Individual groups also have group level settings to indicate whether the upgrade units in that group should be upgraded serially or in parallel.

Some embodiments install an agent in each upgrade unit (or node). The upgrade coordinator in some embodiments generates a playbook (or instruction list) and sends each playbook to the agent in the corresponding node. The upgrade coordinator receives status report and generates progress report from each upgrade unit. The upgrade coordinator aggregates the status reports and progress reports for each group. The upgrade coordinator also aggregates the status and progress reports at the network virtualization platform component level.

The upgrade plan allows the upgrade to be paused either after an error or after the completion of certain upgrades. The upgrade coordinator allows the user to modify the upgrade plan by, for example, adding or deleting upgrade groups, moving upgrade units from one group to another, etc. In addition, there may be changes to the environment such as addition and deletion of upgrade units. The upgrade coordinator in some embodiments reflects these changes in the upgrade plan at different times including before the upgrade is started, after upgrade is paused, before a paused upgrade is resumed, based on certain actions from the user, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an upgrade coordinator for defining and executing an upgrade plan for upgrading software and firmware of different nodes in a network virtualization platform. The upgrade coordinator provides a user interface and a set of APIs to allow the definition of an upgrade plan by a user or through a programmatic interface.

The upgrade coordinator receives status reports and generates progress reports from each upgrade unit and aggregates the status and progress reports for different upgrade groups and components of the network virtualization platform.

I. Automated Upgrade of a Network Virtualization Platform

Figure 1:
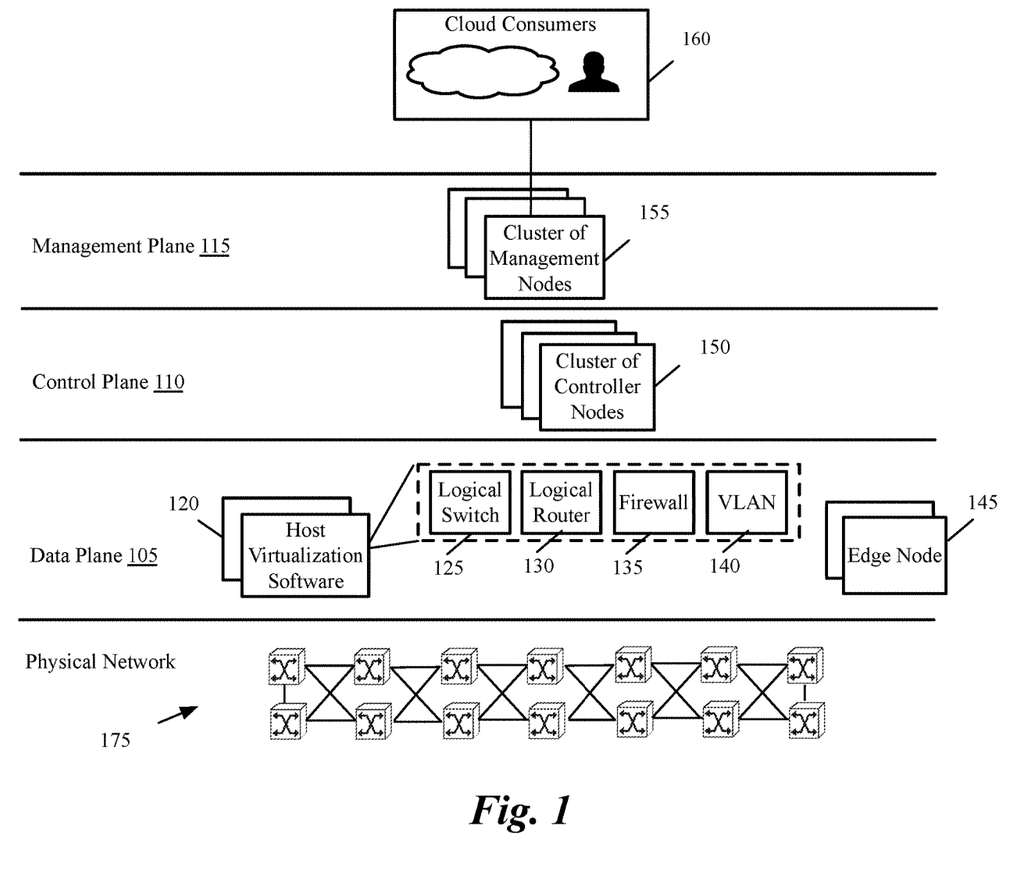
FIG. 1 conceptually illustrates a network virtualization platform in some embodiments.

A network virtualization platform is implemented in several components or planes. FIG. 1 conceptually illustrates a network virtualization platform in some embodiments. As shown, the network virtualization platform architecture includes a data plane 105, a control plane 110, and a management plane 115. The network virtualization platform allows the physical network 175 to be treated as a pool of transport capacity that can be consumed and repurposed on demand.

The data plane 105 is used to carry the network user packet traffic. The data plane includes host machines' virtualization software (e.g., hypervisors) 120 for virtualizing physical resources of the host machine that provides a host managed forwarding element (MFE) for forwarding network traffic (e.g., data messages) to and from virtual machines (not shown), firewall protection 135, virtual local area network (VLAN) 140 functionality, etc. The data plane also includes edge nodes 145 that provide services such as load balancing.

The host MFE, in some embodiments, operates within the virtualization software. In addition, some host machines include one or more virtual machine (VMs) that connect to the host MFE. In some embodiments, the host MFEs are configured to logically forward data messages according to logical forwarding elements configured by an administrator of the network (e.g., logical switches 125, logical routers 130) to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the VMs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

The control plane 110 carries signaling traffic and includes a cluster of control servers (or control nodes) 150, which are used to program elements such as the logical switches, logical routers, etc. The control plane 110 is responsible for configuring network flows in the virtualization software of the hosts. The management plane 115 includes a cluster of management server (or management nodes) 155 that interface to cloud consumers 160 through a set of application programming interfaces (APIs) and user interfaces (UIs). The management plane 115 provides interface to the end users.

A. Upgrade Coordinator and Upgrade Plan

Figure 2:
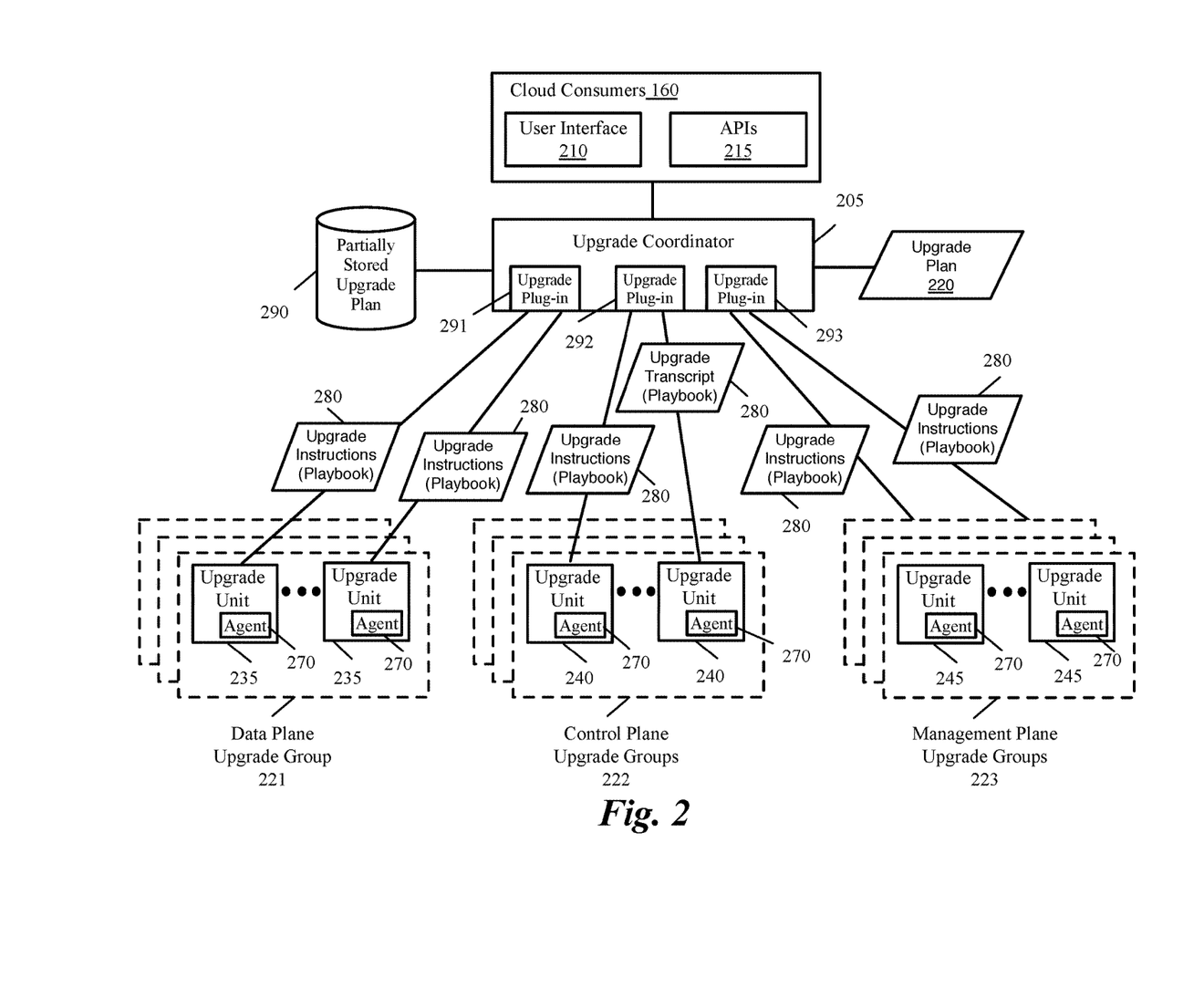
FIG. 2 conceptually illustrates an upgrade coordinator in some embodiments.

Some embodiments provide an upgrade coordinator for defining and executing an upgrade plan for upgrading software for different nodes in a network virtualization platform. FIG. 2 conceptually illustrates an upgrade coordinator for a network virtualization platform in some embodiments.

The upgrade coordinator 205 provides a UI 210 that is used by cloud consumers (e.g., in administrator terminals) 160 to define an upgrade plan for the network virtualization platform. The upgrade coordinator 205 also provides a set of APIs 215 as a programmatic interface for defining the upgrade plan.

The upgrade coordinator 205 in some embodiments is a standalone application that executes on one or more servers and can reside in the management plane. The upgrade coordinator 205 through the UI and/or APIs allows an upgrade plan 220 to be defined.

For each component of the network virtualization platform (i.e., data plane, control plane, or management plane), the upgrade plan in some embodiments includes a list of upgrade groups and each group includes a list of upgrade nodes. The upgrade nodes are referred to herein as upgrade units. The upgrade units can either be an individual node or a cluster of nodes.

As shown, the data plane has several groups 221 of upgrade units 235. Examples of data plane upgrade units include host virtualization software 120 and edge nodes 145 shown in FIG. 1. The control plane also has several groups 222 of upgrade units 240. Example of control plane upgrade units includes controller nodes in the cluster of controller nodes 150 shown in FIG. 1. The management plane also has several groups 223 of upgrade units 245. Example of management plane upgrade units include management nodes in the cluster of management nodes 155 shown in FIG. 1.

Figure 3:
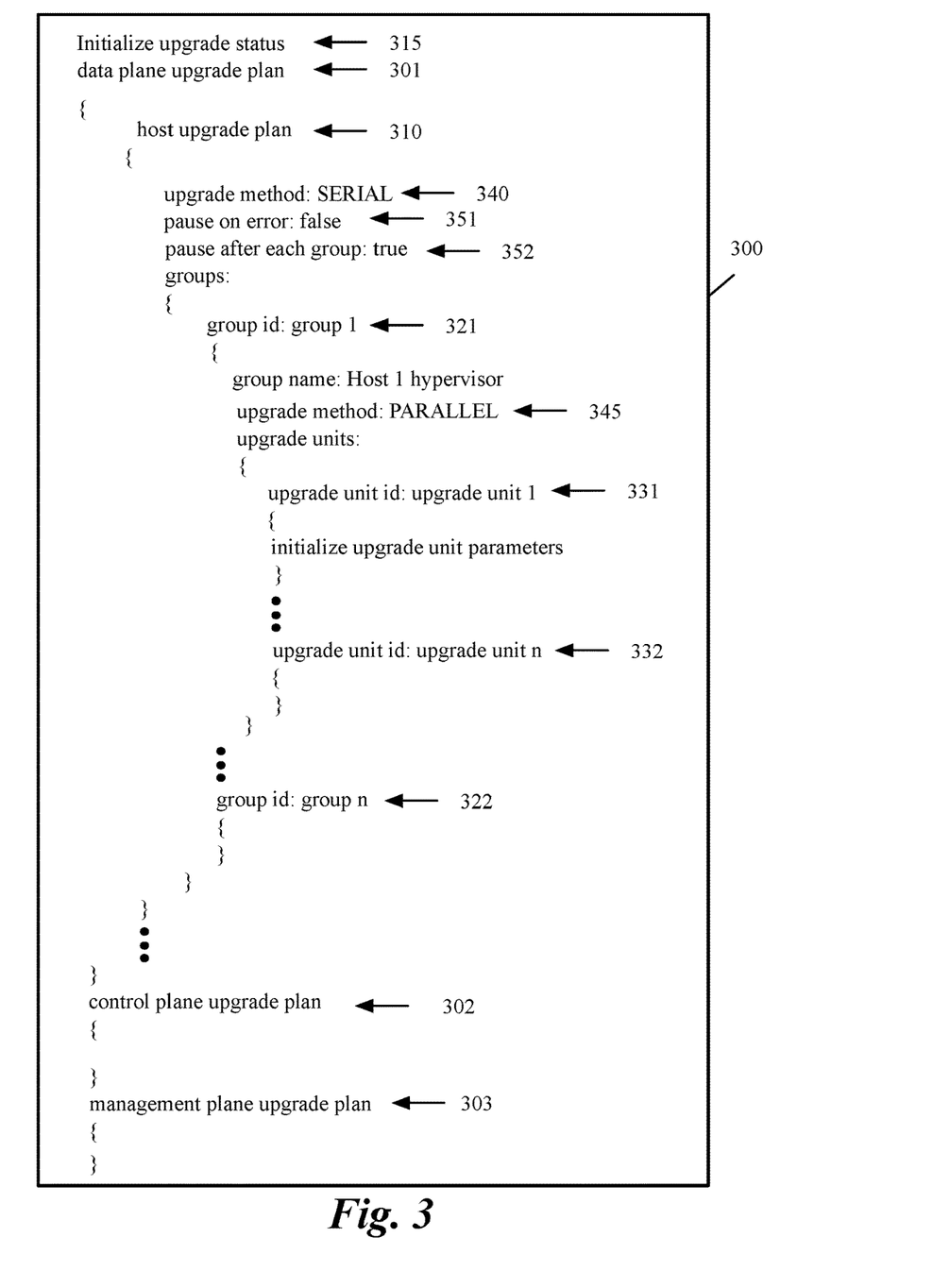
FIG. 3 conceptually illustrates a simplified example of an upgrade plan in some embodiments.

FIG. 3 conceptually illustrates a simplified example of an upgrade plan in some embodiments. As shown, the upgrade plan 300 includes different portions for defining data plane upgrade plan 301, control plane upgrade plan 302, and management plane upgrade plan 303. The upgrade plan initializes (as shown by 315) the upgrade status (e.g., to NOT STARTED) as well as a set of other parameters.

The data plane upgrade plan 301 may have upgrade plans 310 for one or more host virtualization software (only one is shown) and upgrade plans for one or more edge nodes (not shown). A host upgrade plan 310 may define one or more upgrade groups 321-322. Each upgrade group may have one or more upgrade units 331-333.

The upgrade plan in some embodiments has settings to indicate whether the groups in each network virtualization platform component should be upgraded serially or in parallel. Individual groups also have group level settings to indicate whether the upgrade units in that group should be upgraded serially or in parallel. For instance, the upgrade groups for host upgrade plan are upgraded serially (as shown by 340). The upgrade units for upgrade group 1 are upgraded in parallel (as shown by 345). The order of the upgrade in the upgrade plan of some embodiments is upgrade of data plane, followed by the upgrade of the control plane, followed by the upgrade of the management plane.

The upgrade plan can also specify whether or not to stop after each error and/or after upgrading is completed for each upgrade group for each upgrade unit. For instance, the upgrade plan 310 for host indicates that the upgrade should not be paused after an error is encountered (as shown by 351). The upgrade plan 310 for host, however, indicates (as shown by 351) that the upgrade should be paused after upgrading of each upgrade group is completed. The control plane upgrade plan 302 and the management plane upgrade plan 303 each includes a similar nested structure as the upgrade plan 301 for the data plane. In some embodiments, the upgrade plan for the data plane also includes a section for edge nodes upgrade plan (not shown). A more detailed example of an upgrade plan is provided further below.

Referring back to FIG. 2, the upgrade coordinator 205 in some embodiments communicates with an agent 270, which is installed in each upgrade unit (or node). The upgrade coordinator 205 in some embodiments includes one plug-in for each component of the network virtualization platform. For instance, upgrade coordinator 205 includes plug-ins 291-293 for data plane, control plane, and management plane, respectively. Each plug-in communicates with the upgrade agent in the upgrade units of the corresponding component. In some embodiments, the data plane upgrade units 235 include two types of upgrade units: host nodes and edge nodes. In these embodiments, there is one plug-in for the host nodes and one plug-in for the edge nodes.

The upgrade agent 270 in each upgrade unit 235-245 receives upgrade instructions (or a playbook) 280 for the corresponding upgrade unit, executes the instructions, and sends the upgrade status back to the upgrade coordinator.

The upgrade coordinator in some embodiments provides the user with a default upgrade plan that includes all the existing upgrade units in the environment. The user can modify the upgrade plan as per the user's requirements before starting the upgrade or when the upgrade is paused. In some embodiments, the upgrade plan 220 is persisted partially. For instance, only the plan settings (such as whether the upgrade is performed serially or in parallel for a component, whether to pause on error during the upgrade of a component, whether the upgrade is performed serially or in parallel for an upgrade group, whether upgrade for an upgrade group is enabled, etc.), group identifiers, group names, and upgrade units identifiers are saved (as shown by the partially stored upgrade plan 290).

All the other information such as upgrade units details (e.g. version, name, description, type, list of errors, progress/percent of upgrade completed, status, etc.), upgrade group details (e.g., type) is recomputed at runtime when the upgrade coordinator is restarted. This ensures that upgrade coordinator is fault tolerant. After re-computing, the upgrade plan 220 is retained in memory. Thereafter, all operations are performed against a cloned copy of the in-memory upgrade plan 220. Cloning is used to avoid any accidental corruption of the in-memory plan.

Figure 4A:
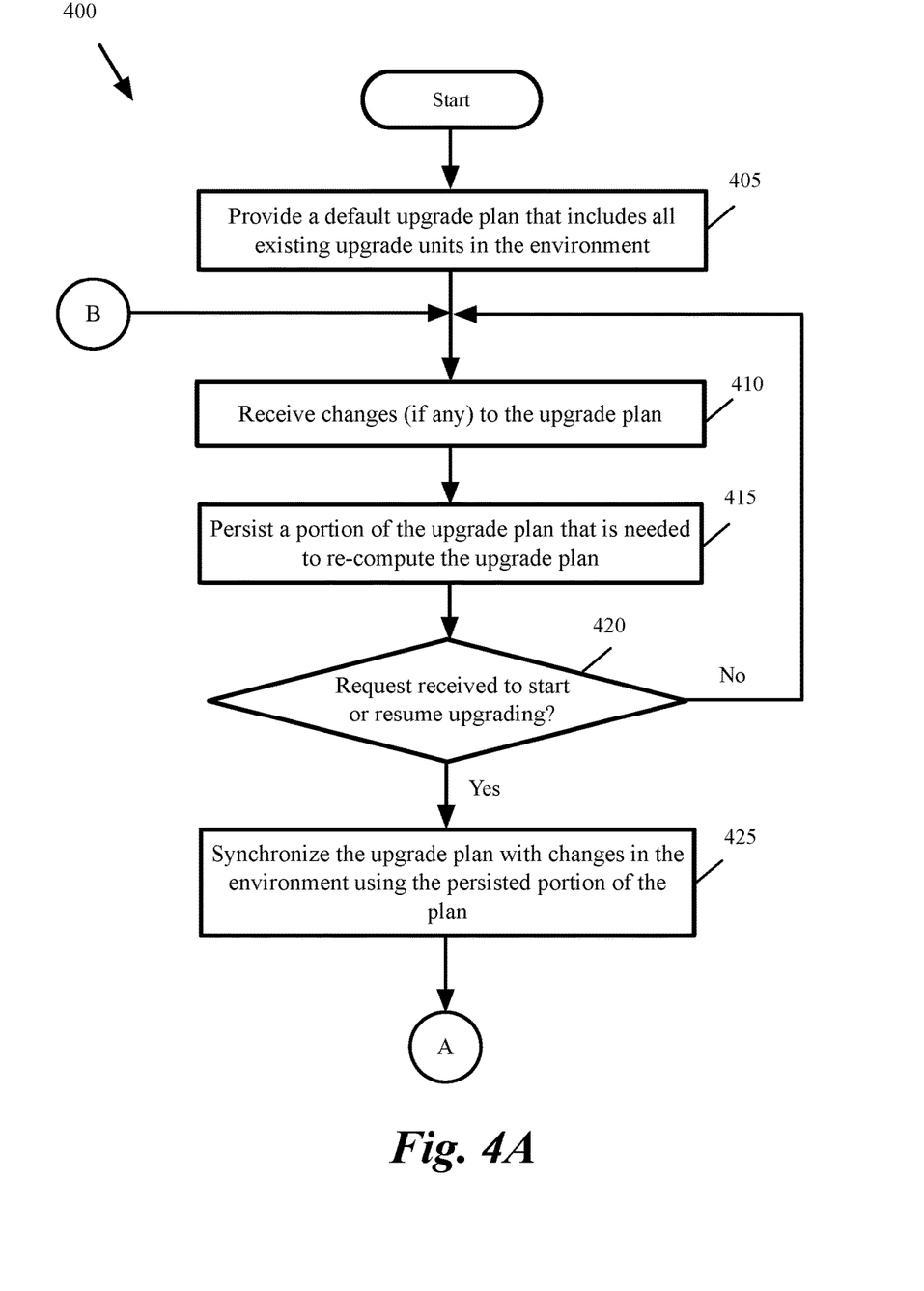
FIGS. 4A and 4B conceptually illustrate a process for generating an upgrade plan and sending upgrade instructions to different upgrade units in some embodiments.
Figure 4B:
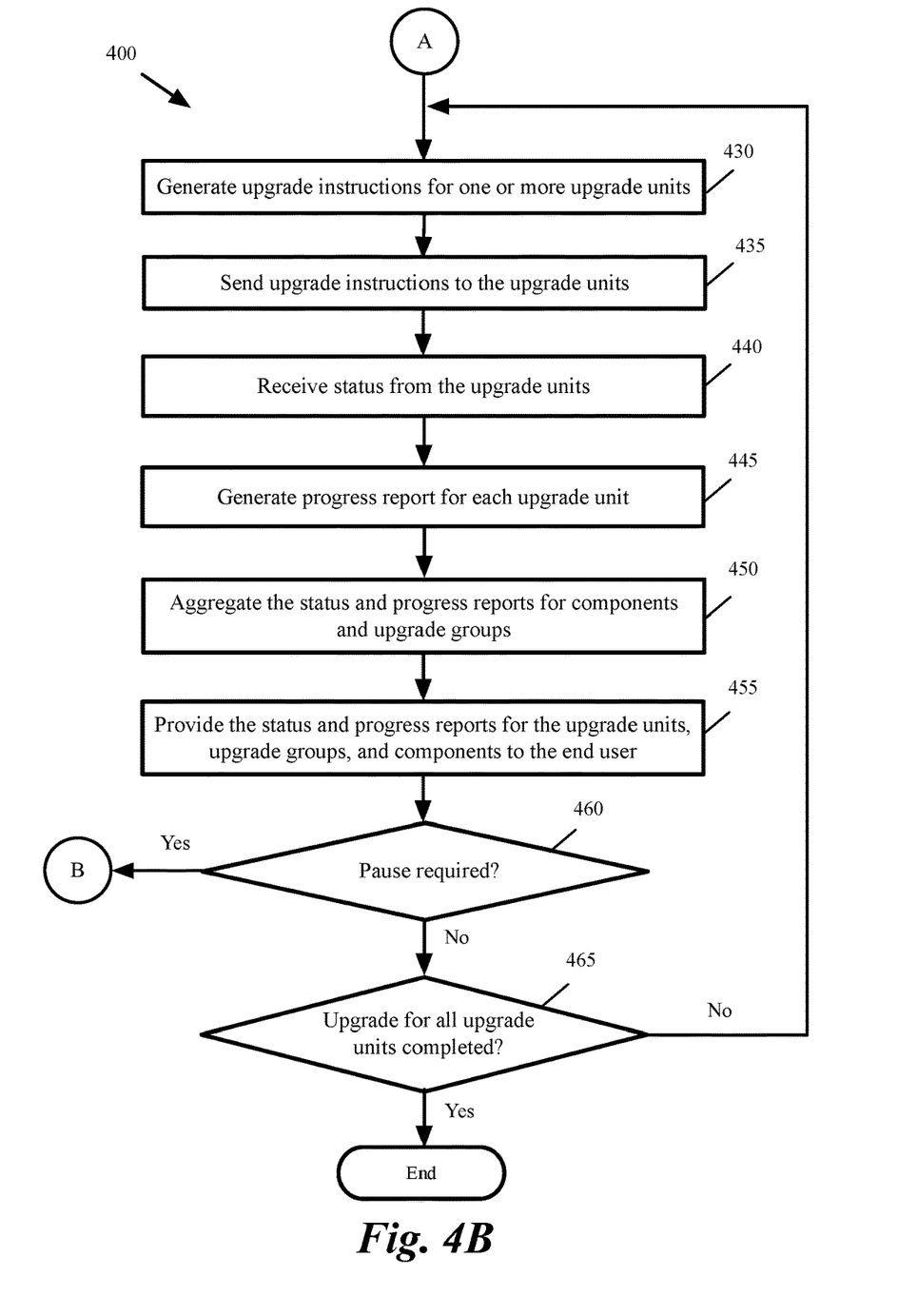

FIGS. 4A-4B conceptually illustrate a process 400 for generating an upgrade plan and distributing upgrade instructions to different upgrade units in some embodiments. The process in some embodiments is performed by an upgrade coordinator such as upgrade coordinator 205 in FIG. 2. As shown, the process provides (at 405) a default upgrade plan that includes all existing upgrade units in the network virtualization platform environment.

The process then receives (at 410) changes (if any) to the upgrade plan. For instance, the process receives changes from a user through a UI or programmatic changes through an API. The process then persists (at 415) a portion of the upgrade plan that is needed to re-compute the upgrade plan. For instance, the process stores the plan settings (such as whether the upgrade is performed serially or in parallel for a component, whether to pause on error during the upgrade of a component, whether the upgrade is performed serially or in parallel for an upgrade group, whether upgrade for an upgrade group is enabled, etc.), group identifiers, group names, and upgrade units identifiers as shown by the partially stored upgrade plan 290.

The process then determines (at 420) whether a request is received to start or resume (e.g., after a pause) the upgrade. If not, the process proceeds to 410, which was described above. Otherwise, the process synchronizes (at 425) the upgrade plan to include any possible changes in the environment. For instance, a user may generate an upgrade plan and execute the upgrade plan after several days. There may also be long pauses after each error where the user tries to identify and mitigate the cause of the error.

In addition, while upgrade is in progress or during a pause, there can be changes in the environment such as addition or deletion of upgrade units. The user may modify the upgrade plan by adding and deleting upgrade groups, moving upgrade units from one group to another, etc. These changes are reflected in the upgrade plan when the plan is synchronized after a pause. The process synchronizes these changes with the upgrade plan at different times including before the upgrade is started, after upgrade is paused, before a paused upgrade is resumed, based on certain actions from the user such as a user command or a browser refresh at the user terminal, etc. The process handles the changes by re-computing the progress and status at each upgrade group and at the component level. This re-computation in some embodiments is performed before starting or resuming the upgrade only and not every time the plan is modified.

The process generates (at 430) upgrade instructions (or playbooks) for one or more upgrade units. For instance, the process may upgrade each component (i.e., data plane, control plane, and management plane) serially. Within each component, the process may trigger upgrade for the upgrade groups serially or in parallel depending on the options set in the upgrade plan. Furthermore, within each group the process may send upgrade instructions for the upgrade units serially or in parallel depending on the options set in the upgrade plan. The upgrade instructions for each upgrade unit include a set of instructions that are relevant to each upgrade unit.

The process then sends (at 435) the upgrade instructions to each upgrade unit. For instance, the process sends upgrade instructions 280 to upgrade agents 270 in upgrade units 235-245 as shown in FIG. 2. The upgrade plan can indicate whether the upgrade for the groups in a component is to be performed serially or in parallel. The upgrade plan can also indicate whether the upgrade for the upgrade units in each upgrade group is to be performed serially or in parallel. Process 400 in some embodiments simultaneously sends the upgrade instructions for all upgrades that are to be performed in parallel.

On the other hand, the upgrade instructions for the upgrades that have to be done serially are sent to the corresponding upgrade units in sequence after the upgrade of a previous upgrade unit in the sequence is completed. If the upgrade is serial, the user can also choose to pause the upgrade process after completion of upgrade of each group.

Some embodiments provide the user with the ability to pause the upgrade process explicitly at any point in time (e.g., by a command from the UI or API). This allows the user to go back and find the root cause of the problem and fix the issue before continuing with the upgrade of next upgrade unit.

The process then receives (at 440) status from each upgrade unit. The process then generates (at 445) progress reports (e.g., percent of upgrade completed) for the upgrade units. In some embodiments, the upgrade instructions for an upgrade unit may include several instructions and the process sends the instructions one at a time to the upgrade unit. The upgrade unit performs the instruction and sends a status (e.g., success or failure status or a code that indicate success or a particular type of error). The process then calculates the upgrade progress for the upgrade unit. For instance, if there are five upgrade instructions for an upgrade unit and three of them are currently performed, the upgrade progress is set to 60% (3 divided by 5). When the next instruction is sent and a status is received, the upgrade progress is set to 80% (4 divided by 5), and so on.

The process then aggregates (at 450) the status and progress reports for each component and upgrade group. The process then provides (at 455) the aggregated status and progress reports for each component and upgrade group as well as the status and progress report for individual upgrade units to the end user.

The upgrade coordinator provides a hierarchical upgrade status reporting. As described above, the status and progress of upgrade units of each group is aggregated at the group level. Similarly, the status and progress of groups is aggregated at the component level. This hierarchical structure provides user with the ability to track upgrade status summary at component and/or group level as well as drill down to detailed status of each upgrade unit.

At 460, the process determines whether a pause is required. For instance, if the upgrade plan required a pause on error for a particular component or upgrade group and an error was reported during the upgrade of an upgrade unit in that component or upgrade group, the process pauses the upgrade by proceeding to 410, which was described above. Also, if the upgrade plan required a pause after completion of the upgrade for a particular upgrade group, the process pauses the upgrade after the completion of the upgrade for the upgrade group by proceeding to 410. Furthermore, if a pause command has been received while the upgrade was in progress, the process also proceeds from 460 to 410.

On the other hand, if a pause is not required, the process determines (at 465) whether the upgrade for all upgrade units is completed. For instance, the process determines whether all instructions for each upgrade unit are sent to the upgrade unit. The process also determines whether all upgrade units in the upgrade plan are upgraded. If upgrade for all upgrade units is completed, the process ends. Otherwise, the process proceeds to 430, which was described above.

Figure 5:
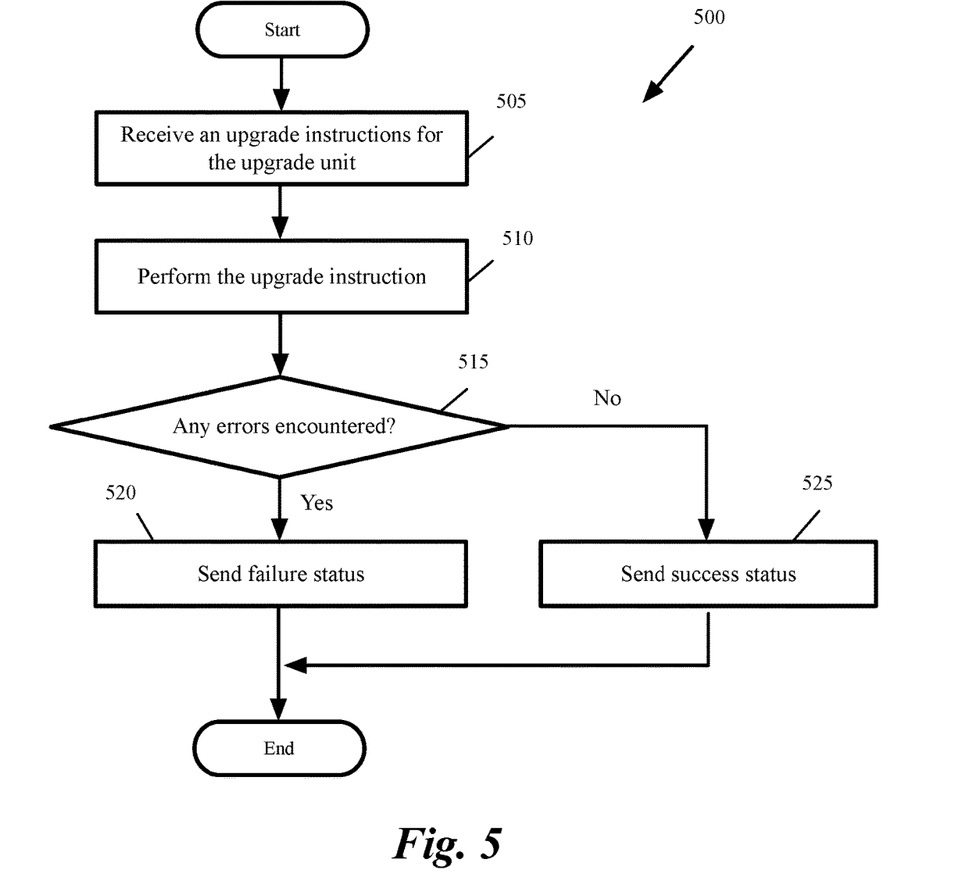
FIG. 5 conceptually illustrates a process performed by an upgrade agent in an upgrade unit in some embodiments.

FIG. 5 conceptually illustrates a process 500 performed by an upgrade agent in an upgrade unit in some embodiments. As shown, the process receives (at 505) an upgrade instruction. For instance, an upgrade agent 270 receives an upgrade transcript 280 from the upgrade coordinator 205 as shown in FIG. 2.

The process then performs (at 510) the upgrade instruction. The process then determines (at 515) whether there were any errors while performing the upgrade instruction. If yes, the process sends (at 520) a failure status back an error status. The process then ends. Otherwise, the process sends (at 525) a success status. The process then ends.

The success or failure status in some embodiments is in the form of a binary response (e.g., 0 is failure and 1 is success or vice versa). In other embodiments, the success or failure status is in the form a code that may specify a success code or one of several different types of errors.

Process 500 in some embodiments is repeated by the upgrade agent for each upgrade instruction. For instance, the upgrade of an upgrade unit may require an instruction to download binary code for a software upgrade using a particular link. The upgrade may also require another instruction for coping the downloaded binary code to a particular partition. The upgrade may further require another instruction for the upgrade unit to switch to the particular partition and reboot from that partition. Each one of these instructions is sent by the upgrade coordinator to the upgrade unit one at a time. The upgrade unit performs process 500 to for each one of the upgrade instructions.

B. Examples of an Upgrade Plan and Upgrade Units

The following is an example of an upgrade plan that includes different sections for a host upgrade plan, an edge upgrade plan, and a configuration plane upgrade plan.

```
{{
    "upgrade_status": "NOT_STARTED",
    "target_version": null,
    "host_upgrade_plan": {      (* Host upgrade plan *)
        "plan_settings": {
            "upgradeMethod": "SERIAL",
            "pauseOnError": false,
            "pauseAfterEachGroup": false
        },
        "groups": [{
            "object_type": "Group",
            "id": "f5ecd220-737e-4d96-bfea-f415ac710603",
            "name": "Group 1 for ESXI",
            "upgrademethod": "PARALLEL",
            "upgrade_units": [{
                        "object_type": "UpgradeUnit",
                        "id": "d056dd1c-345b-11 e6-b935-c73b36669382", "name": "UU-1 "description":""
                        "current_version": 1.0 "warnings":""
                        "errors":""
                        "metadata":""
                        "extendedConfiguration":""
            },
            {
                        "object_type": "UpgradeUnit",
                        "id": "dbe5b8c2-345b-11 e6-842d-95c185207d63", "name": "UU-2 "description":""
                        "current_version": 1.0
                        "warnings":""
                        "errors":""
                        "metadata":""
                        "extendedConfiguration":""
            }],
            "enabled": true,
            "component_type": "HOST",
            "extended_configuration": null
        }]
    },
    "edge_upgrade_plan": {      (* Edge upgrade plan*)
        "plan_settings": {
        "upgradeMethod": "PARALLEL",
        "pauseOnError": true,
        "pauseAfterEachGroup": false
        },
        "groups": [ ]
    },
    "ccp_upgrade_plan": {      (* control plane upgrade plan *)
        "plan_settings": {
            "upgradeMethod": "PARALLEL",
            "pauseOnError": true,
            "pauseAfterEachGroup": false
```

-continued

```
        },
        "groups": [{
            "object_type": "Group",
            "id": "cd096225-778d-481 b-8116-56ffab9ebec8",
            "name": "CcpUpgradeGroup",
            "upgrade_method": "PARALLEL",
            "upgrade_units": [{
                        "object_type": "UpgradeUnit",
                        "id": "10656b5b-8e19-4c0d-8a8c-
dc3884a0f216", "name": UU-3 "description":""
                        "current_version": 1.0 "warnings":""
                        "errors":""
                        "metadata":""
                        "extendedConfiguration":""
            }
            {
                        "object_type": "UpgradeUnit",
                        "id": "f4948b7e-3fe3-4f55-b 173-
8424d5998190", "name": UU-4 "description":""
                        "current_version": 1.0 "warnings":""
                        "errors":""
                        "metadata":""
                        "extendedConfiguration":""
            },
            {
                        "object_type": "UpgradeUnit",
                        "id": "b2b28d90-3098-48ba-8e46-
154e5e5d88be", "name": UU-5 "description":""
                        "current_version": 1.0 "warnings":""
                        "errors":""
                        "metadata":""
                        "extendedConfiguration":""
            }],
            "enabled": true,
            "component_type": "CCP",
            "extended_configuration": null
            }]
        }
    }}
```

The following is an example of different software programs that are upgraded during the upgrade of the upgrade units in some embodiments. The upgraded software programs include link layer discovery protocol (LLDP) Daemon, network virtualization platform inventory discovery agent, network virtualization platform logical exporter, network virtualization platform aggregation service library, command line interface (CLI), network virtualization platform layer 2 (L2) agent, network virtualization platform python protocol buffers (protobuf) used to describe data structures for storage, network virtualization platform service fabric host component, network virtualization platform management plane agent, network virtualization platform agent that communicates with network virtualization controller, network virtualization platform datapath, and network virtualization platform host meta package.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
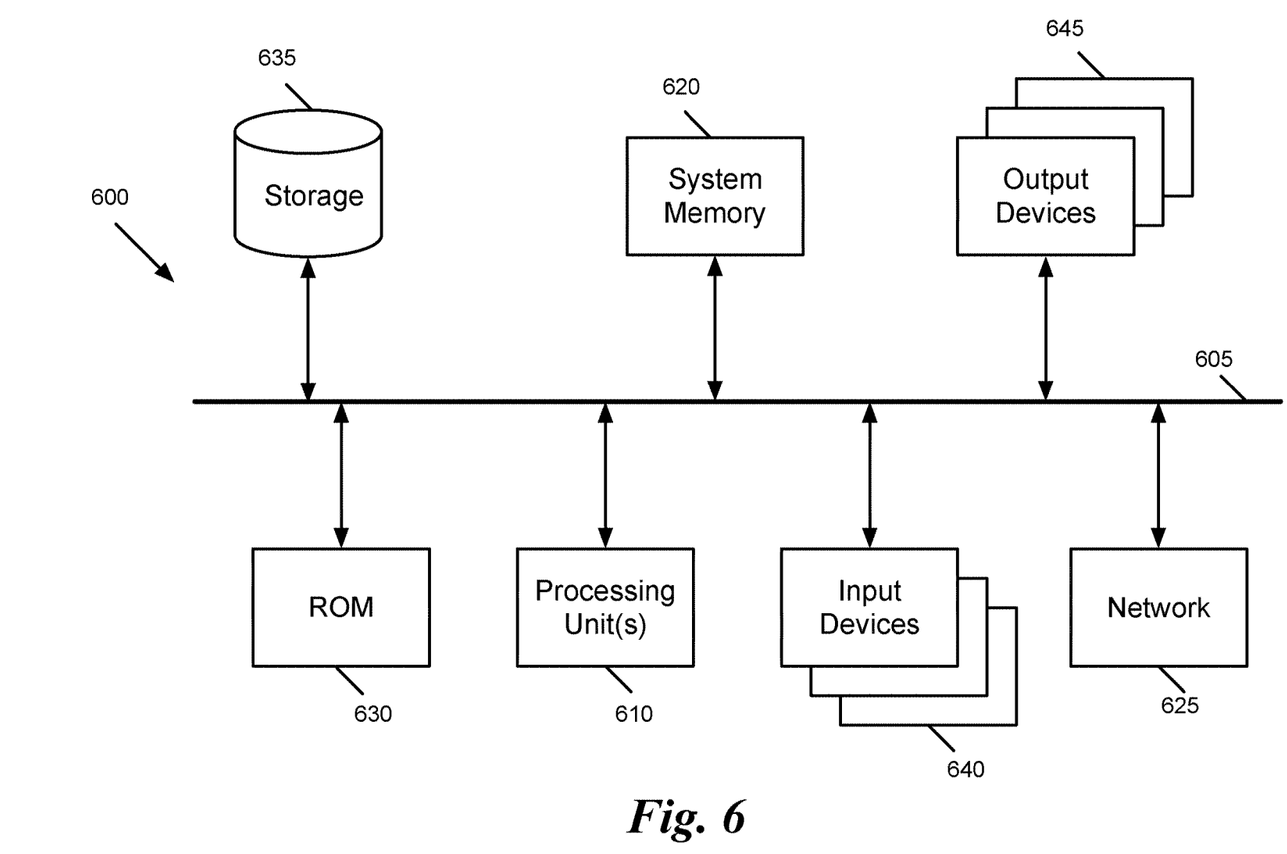
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 620, a read-only memory (ROM) 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 620, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 620 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 620, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 625 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4, and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of upgrading a plurality of nodes of a network virtualization platform, the method comprising:
   at an upgrade controller of the network virtualization platform that defines a plurality of logical forwarding elements over a shared physical network,
      receiving a definition of an upgrade plan to upgrade a plurality of upgrade units that are grouped into a plurality of upgrade groups, each upgrade unit comprising a set of nodes, the upgrade plan identifying each of the upgrade units and specifying a set of parameters for upgrading the upgrade unit;
      sending upgrade instructions to each upgrade unit to trigger upgrade for the upgrade unit;
      receiving different upgrade status reports from different upgrade units;
      repeatedly aggregating data from the received status reports; and
      generating and updating a hierarchical status report (i) to provide a hierarchical display of a progression of the updating of the upgrade units and upgrade groups, (ii) to modify the display of the progression as new upgrade status reports are received and aggregated, and (iii) to provide an ability to track upgrade status at a group level as well as at an upgrade unit level.

2. The method of claim 1, wherein the network virtualization platform comprises a plurality of components comprising a data plane, a control plane, and a management plane, wherein each upgrade group comprises upgrade units for one component of the network virtualization platform, the method further comprising:
aggregating data from the received status reports for upgrade groups of each component; and
generating a hierarchical status report for each component.

3. The method of claim 1, wherein the generated hierarchical status report displays upgrade progress as a percentage of the upgrade instructions performed for each upgrade unit.

4. The method of claim 1, wherein the upgrade plan requires a pause after an error is encountered during the upgrade of an upgrade unit, the method further comprising:
pausing the upgrade after an error is encountered;
receiving a command to resume the upgrade;
updating the upgrade plan based on a set of changes made to one or more upgrade units while the upgrade was paused;
sending upgrade instructions generated based on the updated upgrade plan to each upgrade unit to trigger upgrade for the upgrade unit; and
resuming the upgrade of the network virtualization platform.

5. The method of claim 1 further comprising:
prior to sending the upgrade instructions to each upgrade unit for execution, updating the upgrade plan based on a set of changes made to one or more upgrade units since the upgrade was defined,
wherein sending the upgrade instructions to each upgrade unit comprises sending the upgrade instructions generated based on the updated upgrade plan to the upgrade units.

6. The method of claim 1 further comprising:
prior to sending the upgrade instructions to each upgrade unit to trigger upgrade, storing a subset of the upgrade plan, the subset of the upgrade plan comprising a set of information required to re-compute the upgrade plan;
receiving a command to execute the upgrade plan; and
re-computing the upgrade plan based on the stored subset of the upgrade plan and a set of changes made to one or more upgrade units since the upgrade was defined,
wherein sending the upgrade instructions to each upgrade unit comprises sending upgrade instructions generated based on the re-computed upgrade plan to the upgrade units.

7. The method of claim 6, wherein the subset of the upgrade plan comprises (i) an identifier of each upgrade group, (ii) a name of each upgrade group, (iii) an identifier of each upgrade unit, (iv) and a set of upgrade plan settings comprising whether to pause on errors, whether the upgrade for the upgrade units in a group is performed serially or in parallel, and whether upgrading is enabled for each upgrade group.

8. The method of claim 1, wherein
the network virtualization platform comprises data plane components and control plane components,
the upgrade plan further comprises an upgrade order that specifies that the data plane components have to be upgraded before the control plane components.

9. The method of claim 8, wherein
the network virtualization platform further comprises management plane components, and
the upgrade order specifies that the management plane components are updated after the control plane components.

10. The method of claim 1, wherein
at least one node of one upgrade unit comprises a logical forwarding element, and
at least one node of one upgrade unit comprises a service element.

11. The method of claim 10, wherein the service element comprises one of a firewall service and a load balancing service.

12. A non-transitory machine readable medium storing a program for upgrading a plurality of nodes of a network virtualization platform, the program executable by a processing unit, the program comprising sets of instructions for:
at an upgrade controller of the network virtualization platform that defines a plurality of logical forwarding elements over a shared physical network,
receiving a definition of an upgrade plan to upgrade a plurality of upgrade units that are grouped into a plurality of upgrade groups, each upgrade unit comprising a set of nodes, the upgrade plan identifying each of the upgrade units and specifying a set of parameters for upgrading the upgrade unit;
sending upgrade instructions to each upgrade unit to trigger upgrade for the upgrade unit;
receiving different upgrade status reports from different upgrade units;
repeatedly aggregating data from the received status reports; and
generating and updating a hierarchical status report (i) to provide a hierarchical display of a progression of the updating of the upgrade units and upgrade groups, (ii) to modify the display of the progression as new upgrade status reports are received and aggregated, and (iii) to provide an ability to track upgrade status at a group level as well as at an upgrade unit level.

13. The non-transitory machine readable medium of claim 12, wherein the network virtualization platform comprises a plurality of components comprising a data plane, a control plane, and a management plane, wherein each upgrade group comprises upgrade units for one component of the network virtualization platform, the program further comprising sets of instructions for:
aggregating data from the received status reports for upgrade groups of each component; and
generating a hierarchical status report for each component.

14. The non-transitory machine readable medium of claim 12, wherein the upgrade plan requires a pause after an error is encountered during the upgrade of an upgrade unit, the program further comprising sets of instructions for:
pausing the upgrade after an error is encountered;
receiving a command to resume the upgrade;
updating the upgrade plan based on a set of changes made to one or more upgrade units while the upgrade was paused;
sending upgrade instructions generated based on the updated upgrade plan to each upgrade unit to trigger upgrade for the upgrade unit; and resuming the upgrade of the network virtualization platform.

15. The non-transitory machine readable medium of claim 12, the program further comprising sets of instructions for:
  storing, prior to sending the upgrade instructions to each upgrade unit to trigger upgrade, a subset of the upgrade plan, the subset of the upgrade plan comprising a set of information required to re-compute the upgrade plan;
  receiving a command to execute the upgrade plan; and
  re-computing the upgrade plan based on the stored subset of the upgrade plan and a set of changes made to one or more upgrade units since the upgrade was defined,
  wherein the set of instructions for sending the upgrade instructions to each upgrade unit comprises a set of instructions for sending upgrade instructions generated based on the re-computed upgrade plan to the upgrade units.

16. A system comprising:
  a set of processing unit; and
  a non-transitory machine readable medium storing a non-transitory machine readable medium storing a program for upgrading a plurality of nodes of a network virtualization platform, the program executable by one of the processing units, the program comprising sets of instructions for:
    at an upgrade controller of the network virtualization platform that defines a plurality of logical forwarding elements over a shared physical network,
    receiving a definition of an upgrade plan to upgrade a plurality of upgrade units that are grouped into a plurality of upgrade groups, each upgrade unit comprising a set of nodes, the upgrade plan identifying each of the upgrade units and specifying a set of parameters for upgrading the upgrade unit;
    sending upgrade instructions to each upgrade unit to trigger upgrade for the upgrade unit;
    receiving different upgrade status reports from different upgrade units;
    repeatedly aggregating data from the received status reports; and
    generating and updating a hierarchical status report (i) to provide a hierarchical display of a progression of the updating of the upgrade units and upgrade groups, (ii) to modify the display of the progression as new upgrade status reports are received and aggregated, and (iii) to provide an ability to track upgrade status at a group level as well as at an upgrade unit level.

17. The system of claim 16, wherein the network virtualization platform comprises a plurality of components comprising a data plane, a control plane, and a management plane, wherein each upgrade group comprises upgrade units for one component of the network virtualization platform, the program further comprising sets of instructions for:
  aggregating data from the received status reports for upgrade groups of each component; and
  generating a hierarchical status report for each component.

18. The system of claim 16, wherein the upgrade plan requires a pause after an error is encountered during the upgrade of an upgrade unit, the program further comprising sets of instructions for:
  pausing the upgrade after an error is encountered;
  receiving a command to resume the upgrade;
  updating the upgrade plan based on a set of changes made to one or more upgrade units while the upgrade was paused;
  sending upgrade instructions generated based on the updated upgrade plan to each upgrade unit to trigger upgrade for the upgrade unit; and
  resuming the upgrade of the network virtualization platform.

19. The system of claim 16, the program further comprising sets of instructions for:
  storing, prior to sending the upgrade instructions to each upgrade unit to trigger upgrade, a subset of the upgrade plan, the subset of the upgrade plan comprising a set of information required to re-compute the upgrade plan;
  receiving a command to execute the upgrade plan; and
  re-computing the upgrade plan based on the stored subset of the upgrade plan and a set of changes made to one or more upgrade units since the upgrade was defined,
  wherein the set of instructions for sending the upgrade instructions to each upgrade unit comprises a set of instructions for sending upgrade instructions generated based on the re-computed upgrade plan to the upgrade units.

20. The system of claim 19, wherein the subset of the upgrade plan comprises (i) an identifier of each upgrade group, (ii) a name of each upgrade group, (iii) an identifier of each upgrade unit, (iv) and a set of upgrade plan settings comprising whether to pause on errors, whether the upgrade for the upgrade units in a group is performed serially or in parallel, and whether upgrading is enabled for each upgrade group.

* * * * *